United States Patent Office 2,744,325
Patented May 8, 1956

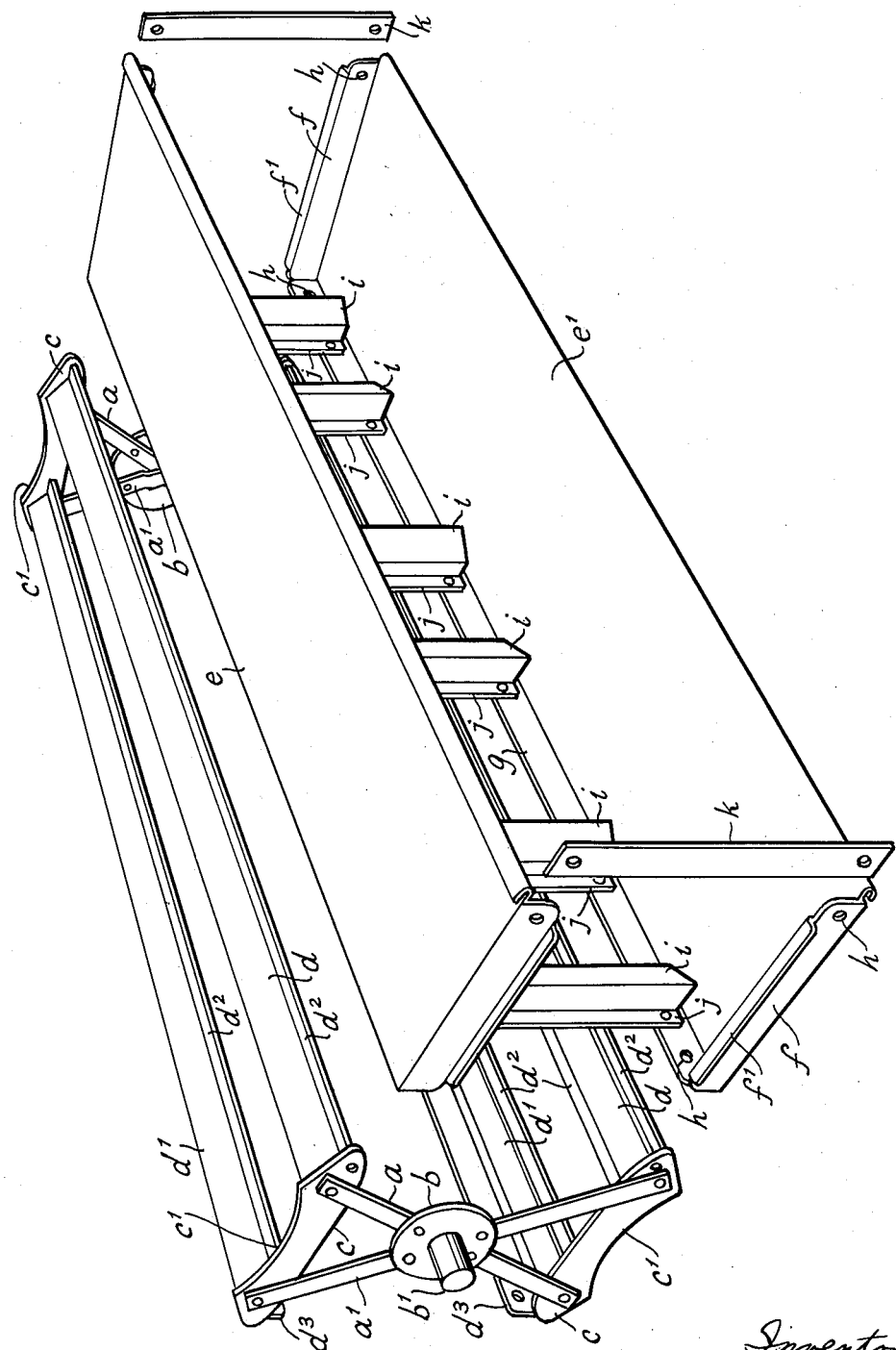

2,744,325
STORAGE RACKS FOR CHEESES

John Gordon Robinson Eales, Dudley, and Eric Hale, Kempshott, Basingstoke, England, assignors to Co-Operative Wholesale Society Limited, Manchester, England, a British society Application June 23, 1953, Serial No. 363,626

Claims priority, application Great Britain June 5, 1953

2 Claims. (Cl. 31—49)

This invention relates to a reversible storage rack for cheeses of the kind comprising a skeleton box-like holder, open along one side for insertion and removal of the cheeses and mounted at its ends on trunnions for turning through 180 degrees with the said open side uppermost when the holder has turned halfway. The holder consists essentially of parallel and opposite shelf-like panels either of which while undermost forms a supporting shelf for cheeses, the other temporarily forming the top. These two shelves are connected along one edge by a series of uprights forming the third longitudinal side of the holder, which uprights have to support the cheeses on their cylindrical walls during the turning over operation and may be shaped so as also to position the cheeses to space them from one another and prevent one from touching another during storage.

The purpose of a reversible storage rack is to simplify and speed up the operation, previously performed manually, of turning the cheeses, which are normally of cylindrical shape, so that after standing for a period on one end they may be turned to stand on the other end. Such turning should be effected regularly during maturing as well as storage, and such operation can be mechanised as aforesaid by arranging the racks so that they can be turned while loaded with little or no loss of storage space, as against a considerable saving of time and labour resulting from such mechanism.

However the holders should be cleaned at least at each reloading of the holders, an operation which is never very easy because of the restriction of access resulting from the necessity to obtain maximum storage capacity in a given space and because deposits from the cheeses have generally had time to become firmly adhered and hardened. Whilst it has been proposed to make the rotatable holder with withdrawable shelves this has the disadvantage that the shelves serve no useful purpose in providing strength and rigidity to the box-like structure of the rotatable unit. Also this does not facilitate cleaning of the uprights aforesaid or third side the function of which is to support the cheeses during the turning over of the rack.

One object of the invention is to provide detachability of all parts requiring cleaning while enabling said parts when in their normal positions to constitute frame members of the reversible storage rack.

Another object of the invention is to enable additional rigidity to be given to the detached parts when removed from the support of the reversible framework, so as to facilitate cleaning and reduce risk of distortion.

Other objects of the invention can be appreciated from the following description of one example of a reversible cheese storage rack made in accordance with the invention.

According to the invention, a reversible cheese storage rack comprises a skeleton frame, trunnions at the end of the frame for mounting the same for turning about a horizontal axis, a three-sided holder adapted to fit into said frame and means for securing said holder to the skeleton frame so that at least part of said holder forms a frame member of the rack supplementary to the said skeleton frame.

The reversible cheese storage rack aforesaid may be characterised by strut means for temporarily connecting the free edges of the three-sided holder to support the same while removed from the skeleton frame.

The accompanying drawing is an exploded view of one example of a reversible cheese storage rack made in accordance with this invention. The storage rack consists of two main parts, respectively a skeleton frame and a three-sided removable holder. The rotatable frame consists of a pair of X-shaped end members, one at each end each formed of arms, $a$, $a'$ secured to the disc-like flanges $b$ of trunnions $b'$. Secured to and connecting the ends of the arms $a$, $a'$ are tie members $c$ having their outer edges at $c'$ of shallow U-shape for reasons explained later. Connecting the ends of the two end members are longitudinal frame members $d$ and $d'$. Each longitudinal member is V-shaped in cross-section and has flanges $d^2$ at the ends of the V which lie in a common plane. In the case of the members $d'$, one of the flanges $d^2$ has an extension $d^3$ set at right angles to the said flange.

The three-sided removable holder comprises a pair of shelves $e$, $e'$ each formed with end flanges $f$ each with an outward turned lip $f'$, and with a longitudinal flange $g$. In the flanges $f$ and $g$ are bolt holes $h$ some only of which are visible. The two shelves are connected together by three pairs of hollow uprights $i$ of bent metal having base flanges $j$ secured by rivets to the flanges $g$ of the shelves. The two uprights of a pair have oppositely inclined faces adapted to form a cradle for a cylindrical cheese during the turning over operation.

The cheese holder slides into and out of the skeleton frame, the lips $f'$ sliding on the straight edges of the tie members $c$. When in position the flanges $g$ of the shelves lie against the flanges $d^3$ of the skeleton frame and the holder may be secured by bolts with wing nuts located at the bolt holes $h$ aforesaid. In such position, the shelves $e$, $e'$ and the uprights $i$ form frame members of the cheese rack supplementary to the members of the skeleton frame.

When the three sided holder is removed from the skeleton frame, further uprights $k$ are provided which are adapted to be secured to the free ends of the shelves to provide mutual support and prevent distortion of the holder during cleaning. The uprights will of course be secured by means of some of the bolts and wing nuts removed to enable the holder to be removed from the skeleton frame.

The shallow arcuate edge of the tie members $c$ conform to the sweep of an adjacent reversible cheese storage rack above or below the same so that such racks may be placed nearer than would otherwise be possible while permitting the racks to be turned over.

We claim:

1. A reversible cheese storage rack comprising a skeleton frame including spaced, upper and lower longitudinal frame members, end members supporting the longitudinal members in spaced relation, and trunnions secured centrally of said end members and extending outwardly therefrom for mounting the same so to be capable of rotation about a horizontal axis, and a cheese-holder which is movable into and which is removable from the frame and including upper and lower horizontal shelves and vertical frame members secured at their ends along one longitudinal edge of the shelves to maintain the shelves in spaced relationship and provided with inclined faces to form a supporting cradle for a cylindrical cheese during the turning operation, the opposite longitudinal face of the holder being open to permit insertion of the cheese bodies into the holder, and means securing the holder to the skeleton frame to give extra rigidity thereto, the upper shelf becoming the lower shelf when the skeleton frame is inverted.

2. A reversible cheese storage rack comprising a skeleton frame including spaced, upper and lower longitudinal frame members, end members supporting the longitudinal members in spaced relation each end member comprising a disc provided with a trunnion secured centrally thereof and extending outwards therefrom for mounting the frame for rotation about a horizontal axis, and arms extending radially from the disc which are secured at their outer ends to the longitudinal members, a holder which is movable into and which is removable from the frame and including upper and lower horizontal shelves and a plurality of pairs of vertical frame members secured at their ends along one longitudinal edge of the shelves to maintain the shelves in spaced relationship, each pair of frame members being provided with inclined faces to form a supporting cradle for each cylindrical cheese during the turning operation, the opposite longitudinal face of the holder being open to permit insertion of the cheese bodies into the holder, and means for securing the holder to the skeleton frame to give extra rigidity thereto, the upper shelf becoming the lower shelf when the skeleton frame is inverted.

References Cited in the file of this patent

UNITED STATES PATENTS

| | | |
|---|---|---|
| 37,410 | Ainger et al. | Dec. 9, 1862 |
| 273,098 | Joslin | Feb. 27, 1883 |
| 1,837,857 | Freeman | Dec. 22, 1931 |